Sept. 26, 1950        H. BEHR        2,523,352
ADJUSTABLE GAUGE WARNING SIGNAL SWITCH
Filed April 23, 1949
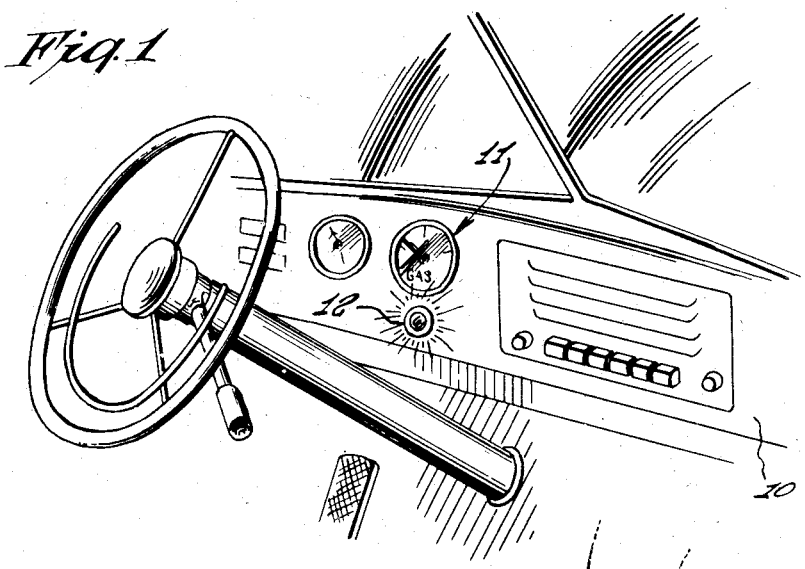
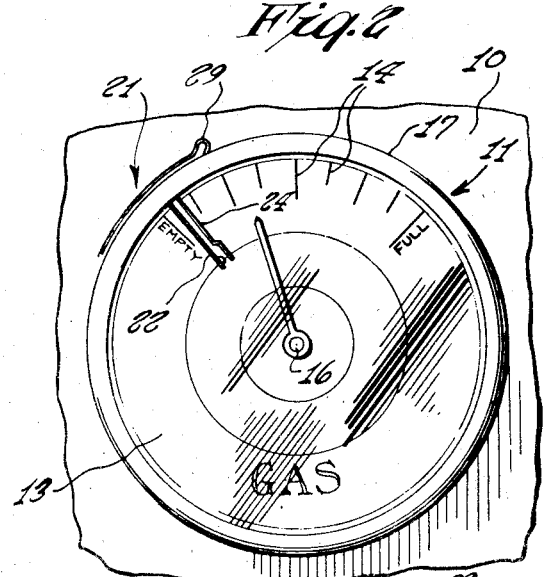
INVENTOR.
HENRY BEHR
BY F. Ledermann
ATTORNEY Patented Sept. 26, 1950

2,523,352

UNITED STATES PATENT OFFICE 2,523,352

ADJUSTABLE GAUGE WARNING SIGNAL SWITCH

Henry Behr, Jamaica, N. Y.

Application April 23, 1949, Serial No. 89,170

1 Claim. (Cl. 200—56)

This invention relates to gages indicative of liquid, gas, or steam pressure and which embody the utilization of a graduated dial and an indicator in the form of a needle or finger mounted on a pivot and adapted to swing across the dial to indicate the pressure in the system. The main object of the invention is the provision of means adjustably mounted on the gage or gage frame so that it may be positioned at any point within the range of the gage, to function in cooperation with the gage needle to close an electric circuit through an alarm to call attention to the fact that the gage reading is that at which the alarm was set to be energized.

A particular adaptation of the invention lies in its application to the gasoline gage of an automotive vehicle, and this adaptation is illustrated in the accompanying drawings. Automobile drivers are naturally interested in always having sufficient fuel in the tank, as are of course operators of motor vehicles or boats of all types, to prevent running out of fuel. The device of this invention may therefore be applied to the fuel gage of such vehicles as boats and set in such a position as to give an audible or visible alarm, or both, when the quantity of fuel remaining in the tank reaches a given low level, so that the operator will be reminded to replenish his fuel.

The above as well as other objects will be clarified, with reference to the accompanying drawing, in the following description wherein characters of reference refer to like-numbered parts in the drawing. It is to be noted that the drawing is intended solely for the purpose of illustration, and that it is therefore neither desired nor intended to limit the invention to any or all of the exact details of construction shown except insofar as they may be deemed essential to the invention.

Referring briefly to the drawing:

Fig. 1 is a fragmentary perspective view of the interior of an automobile, showing the dash board thereof provided with a gasoline gage and a visible alarm adapted to be energized in the manner described below.

Fig. 2 is a fragmentary front elevational view of the dash board of the vehicle, showing the gasoline gage, equipped with the adjustable circuit-closing means of this invention.

Fig. 3 represents a fragmentary enlargment of Fig. 2, with parts broken away to expose the interior, and partly in section, and also includes a wiring diagram.

Fig. 4 is a sectional view taken on the line 4—4 of Fig. 3.

Referring in detail to the drawing, the numeral 10 indicates the dash board of an automotive vehicle, having mounted therein the gasoline or fuel gage 11 and also a visible alarm or light bulb 12. Instead of the light bulb 12, or in addition thereto, an audible alarm such as a bell or buzzer, not shown, might of course be provided.

Fig. 2 shows the gage 11 more clearly, the dial 13 thereof being graduated at 14 in the usual manner. The dial needle 15, pivoted on a shaft 16, is adapted to swing through the usual arc between the "empty" and "full" graduations of the dial, being actuated by the usual means, not shown, which move the needle proportionately with the quantity or level of gasoline contained in the fuel tank, not shown.

The gage 11 may constitute a cylindrical frame 17 having the glass disc 18 providing the front wall of the gage housing and the disc 19 providing the rear wall. The dial 13 is secured against the rear wall 19. Over that arcuate length of the cylindrical frame 17 positioned adjacent the graduations 14, a slot 20 is cut through the frame 17 intermediate the width of the frame. This slot may extend the arcuate length of the graduated portion of the dial, or through part of the length thereof.

A member 21 includes a finger 22 which extends through the slot 20 and is positioned radially with respect to the dial 13. A block 23 of insulating material is secured to the finger 22 near the base of the latter, and a second finger 24 has its base secured to the block 23 so that the finger 24 lies substantially parallel with the finger 22. Both fingers 22 and 24 are made of metal strips so that they possess resiliency, and the finger 22 has a metallic contact button 25 on its free end.

The finger 22 extends substantially at right angles from and is integral with a strip 26 which has a stamped out detent or tooth 27 intermediate its length. From the extremity of the strip 26, the member 21 further comprises the relatively long arm 28 which constitutes a doubled-back extension of the strip 26. The right-hand end of the member 21 outside the frame 17 is turned up at 29 to provide a finger grip. The left-hand end of the arm 28 is deformed to provide a rounded tip 30 urged by the resiliency of the member 21 into frictional contact with the surface of the frame 17.

The slot 20 has a smaller width than the width of the finger 22 except for the portion 22a of the finger 22, this portion 22a constituting a neck of reduced width passing through the slot 20, as shown in Fig. 4. Thus the opposed shoulders 31 formed in the finger 22 provide stops which prevent the finger 22 from radial movement in the slot.

It is now apparent that normally the resiliency of the member 21 causes the tooth 27 to be urged against the frame 17. In order that the member 21 may be releasably locked in any arcuate position on the frame within its range of movement, the two sides of the slot 20, or rather that portion of the frame 17 on the sides of the slot 20, are provided with aligned serrations 32 complementary to the tooth 27. Thus the tooth 27 is normally urged into engagement with a pair of aligned serrations 32. In order to move the member 21 in either direction along the cylindrical frame 17, the grip 29 is lifted by the finger 33 of the operator to disengage the tooth 27 from the serrations 32 and the member 21 is then readily moved with the foot 30 sliding frictionally over the smooth portion of the frame 17.

The fingers 22 and 24 provide the two contacts of a circuit closer through the alarm 35 and battery 36 through the medium of an insulated lead 34 and a ground lead 37. Assuming any setting of the member 21, such as, for example, that shown in Fig. 2 to give the alarm when the fuel tank is slightly less than one-eighth full, as the needle gradually swings toward the left it will eventually meet the finger 24, and then further movement to the left will, owing to the resiliency of the finger 24, cause the latter to meet the contact button 24. This closes the circuit through the alarm 35 to energize the latter and warn the operator that his fuel supply needs replenishing.

Obviously modifications in form or structure may be made without departing from the spirit or scope of the invention.

I claim:

In combination with a gage including a cylindrical housing having a graduated dial mounted therein and a needle pivotally mounted therein adapted to swing through an arc to indicate on the graduated dial the condition of the system in which it is connected, such as, for example, the quantity of gasoline in a gasoline tank, a member slidably mounted on the periphery of said housing, said housing having a slot therein intermediate the width of the housing, said member having a normally open circuit closer thereon extending radially through said slot and positioned in the orbit of said needle, means for releasably locking said member in any position along the length of said slot, said circuit closer being adapted to be connected with a source of electrical supply and an alarm to energize the alarm upon closing of the circuit closer, said circuit closer comprising a pair of spaced contacts both positioned in the plane of said orbit, at least that one of said contacts positioned between the other of said contacts and said needle being resilient and being adapted to be forced by said needle against said other of said contacts as said needle swings toward said circuit closer upon variation of the said condition, said other of said contacts comprising a finger of greater width than the width of said slot except for a portion thereof at the base thereof, said portion being reduced in thickness to less than the width of said slot, said housing having aligned pairs of serrations thereon on the sides of said slot, said member being made of resilient material and having a tooth thereon normally urged by the resiliency of said member against said serrations.

HENRY BEHR.

REFERENCES CITED

The following references are of record in the file of this patent:

UNITED STATES PATENTS

| Number | Name | Date |
|---|---|---|
| 724,724 | Mitchell | Apr. 7, 1903 |
| 843,929 | Charland | Feb. 12, 1907 |
| 1,412,451 | Collins | Apr. 11, 1922 |